United States Patent Office 2,878,166
Patented Mar. 17, 1959

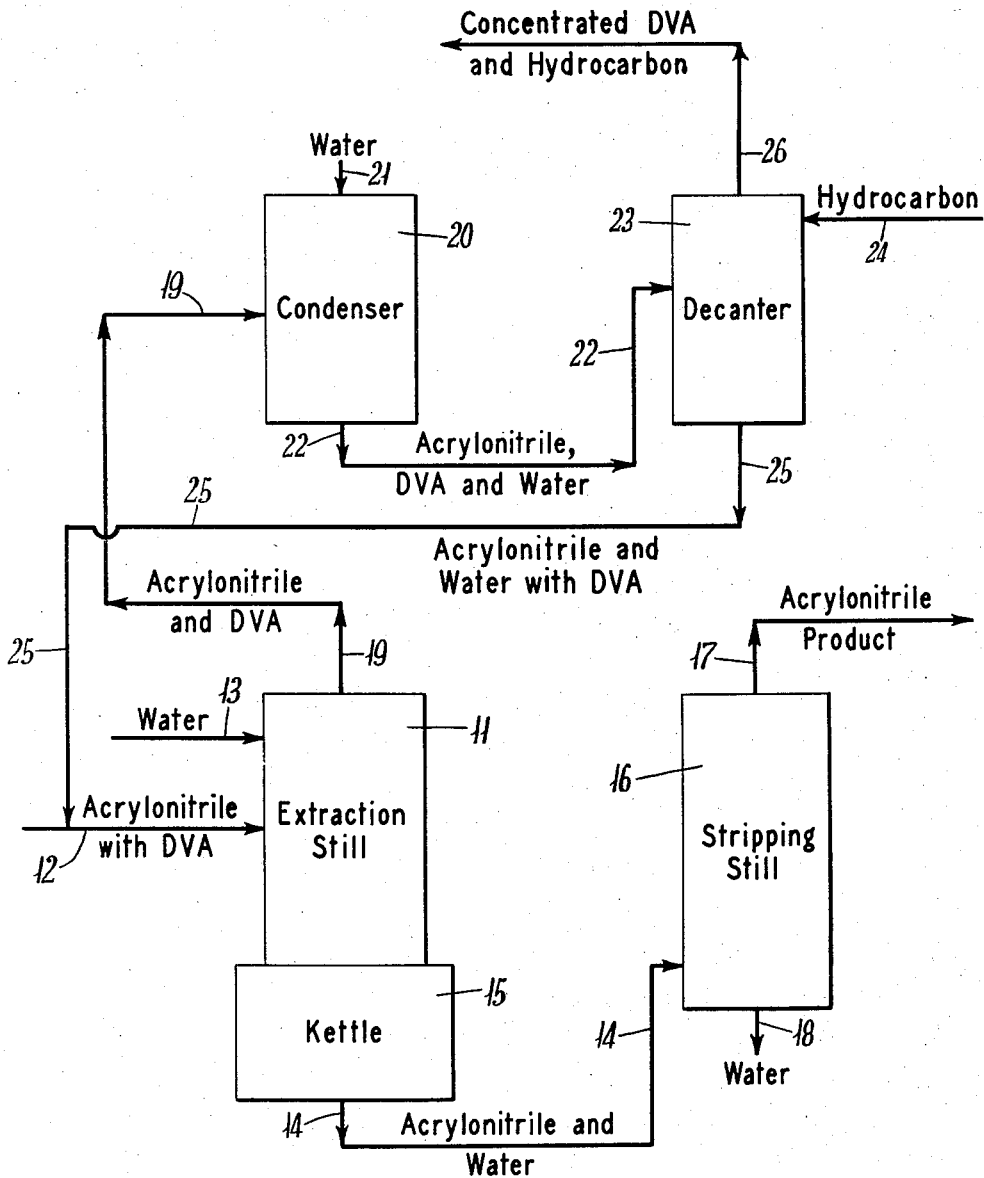

2,878,166

REFINING OF ACRYLONITRILE

Jesse T. Dunn, Charleston, W. Va., assignor to Union Carbide Corporation, a corporation of New York Application September 28, 1956, Serial No. 612,817

6 Claims. (Cl. 202—39.5)

This invention relates to chemical processes. More particularly it relates to the refining of acrylonitrile.

The production of acrylonitrile by the liquid phase reaction of acetylene and hydrogen cyanide is well known. When produced by this or similar processes, the acrylonitrile is contaminated with many side-reaction produced impurities, particularly acetaldehyde, vinylacetylene, chloroprene, divinylacetylene, cyanobutadiene and lactonitrile. All such impurities can be readily removed by one or more fractionations, with the exception of divinylacetylene, which is usually present in the amount of from about 0.2 percent to 1.5 percent by weight of the acrylonitrile.

The divinylacetylene impurity as is known, is actually a mixture of two isomers, 1,5-hexadiene-3-yne and 1,3-hexadiene-5-yne, which have boiling point temperatures of 85° C. and 83.4° C., respectively. These isomers from an azeotropic mixture with acrylonitrile. This azeotrope has a boiling point of about 75° C. while pure acrylonitrile has a boiling point temperature of 77.1° C. Because the boiling points of acrylonitrile and of its divinylacetylene azeotrope are so close together, removal of the divinylacetylene impurity by fractionation would require extremely efficient fractionating columns and very close control. When relatively small amounts of divinylacetylene are present, very little reduction in the quantity present can be accomplished by the fractionation method. For example, it was found in laboratory experiments that in order to reduce the quantity of divinylacetylene in acrylonitrile by fractionation from 1.5 percent by weight to about 0.1 percent, nearly 90 percent of the acrylonitrile had to be removed as containing more than 0.1 percent before this low concentration could be reached.

The extent to which divinylacetylene must be removed from acrylonitrile will depend to some extent upon the use to which the acrylonitrile is to be put. For some applications acrylonitrile containing 500 parts per million (or 0.05 percent by weight) of divinylacetylene is satisfactory. It is known, however, that even such small amounts as 500 parts per million can lower the quality of synthetic rubber or resin produced. For a number of applications, particularly in the synthetic fibers field, it is necessary that the acrylonitrile contain no more than 15 parts per million of divinylacetylene, and preferably 1 part per million or less.

In recent years numerous methods and procedures have been proposed for purging divinylacetylene from acrylonitrile. Some improvement over fractionation techniques has been made by means of azeotropic distillation with water or with an alcohol such as methanol. Such procedures fail to achieve the desired low levels of divinylacetylene, however. P. Kurtz described fractionation of acrylonitrile (United States Patent Re. 23,265, reissued Sept. 5, 1950), as well as scrubbing the acrylonitrile product gases with water and then distilling (United States Patent 2,324,854, issued July 20, 1943), but these methods do not reduce the divinylacetylene content of the acrylonitrile to only a few parts per million. Several methods involving chemical reaction have been proposed. In such methods the divinylacetylene reacts with a chemical compound to form a new compound which is then removed from the acrylonitrile. For example, H. S. Davis et al., suggested treating polymer contaminated acrylonitrile with sulfuric acid, neutralizing, filtering and distilling (United States Patent 2,361,367, issued October 31, 1944). E. L. Carpenter proposed chlorination or bromination of divinylacetylene (United States Patent 2,382,383, issued August 14, 1945). Such chemical methods have been found to still leave appreciable quantities of divinylacetylene in acrylonitrile and these methods present the problems of corrosion, etc. usually associated with such chemical reactions.

Solvent extractions with water and hydrocarbon is suggested by H. S. Davis (United States Patent 2,471,635, issued March 18, 1947), a method which removes much of the divinylacetylene but does not reduce its concentration in the acrylonitrile to the desired level. Gas scrubbing is suggested by G. H. Lovett (United States Patent 2,526,676, issued October 24, 1950). This method, for which no efficiencies are given, is a complicated one involving much apparatus and extensive operation in the gaseous phase. A water scrubbing of acrylonitrile combined with oil scrubbing of the acetylene gas used to produce it are discussed by J. P. Zwilling et al. (United States Patent 2,579,638, issued December 25, 1951), another method for which no degree of removal is listed and which requires extended operation in the gaseous phase. In another attempt to reduce the quantity of divinylacetylene in the acrylonitrile produced, A. F. MacLean et al. (United States Patent 2,621,204, issued December 9, 1952), suggest, in the production of acrylonitrile, simultaneously scrubbing of the reaction gases with a hydrocarbon liquid such as toluene. A complicated procedure for impurity removal involving partial condensation, water extraction and gas scrubbing as part of the production of acrylonitrile is proposed by G. H. Lovett (United States Patent 2,649,472, issued August 18, 1953).

Steam distillation has also been suggested for the refining of acrylonitrile. C. J. Stehman (United States Patent 2,684,978, issued June 27, 1954), has suggested treating an aqueous solution of acrylonitrile with steam so as to vaporize it and then washing the vapors with acetylene to remove impurities. Steam distillation has also been suggested by H. S. Kemp et al. (United States Patent 2,681,306, issued June 15, 1954), which proposes steam distilling of all the acrylonitrile and impuries, and extracting the mixed condensate with water. The removal of water soluble impurities by an agitated water washing is discussed by R. R. Wenner et al. (United States Patent 2,684,979, issued July 27, 1954).

By the process of the present invention it is possible to reduce the concentration of divinylacetylene in acrylonitrile to less than 1 part per million if desired. For those applications where a higher percentage of divinylacetylene can be tolerated the reduction need not be so severe. Reductions of the divinylacetylene concentration to 500 parts per million or to 10-15 parts per million, for example, are readily achieved by the process.

According to the process of our invention divinylacetylene is removed from acrylonitrile by a process of extractive distillation wherein vapors of the acrylonitrile contaminated with divinylacetylene are countercurrently contacted with water, at an elevated temperature. As distillation of the mixture proceeds, divinylacetylene is removed as distillate together with a small proportion of the acrylonitrile, usually from 1 to 10 percent by weight of the feed, and some water. The major portion of acrylonitrile is freed of substantially all of the divinylacetylene originally contained by it, and remains as an aqueous solution residue. The aqueous solution of acrylonitrile can then be distilled and acrylonitrile substantially free of divinylacetylene is recovered as distillate product containing a very small amount of water, about 3.3 percent by weight. This water can be removed, if desired, by conventional techniques such as azeotropic distillation.

The process of our invention is adaptable to either batch or continuous operation. In a preferred embodiment of the invention the process is operated continuously, employing an extraction still mounted on top of a vessel such as a kettle. Acrylonitrile contaminated with divinylacetylene is fed continuously into the extraction still, preferably at about the middle of the still. Water is fed continuously into the top of the still. The temperatures in the kettle at the base of the still is such that boiling occurs continually in the kettle. Boiling is provided at such a rate that the incoming water condenses and dissolves all but about 10 percent by weight or less of the acrylonitrile fed to the still. The aqueous extract of acrylonitrile containing about 90 percent by weight or more of the acrylonitrile fed to the still, and substantially free of divinylacetylene, passes continuously down through the still column and into the kettle, from which it is continuously withdrawn. The other 10 percent by weight or less of the acrylonitrile fed to the still leaves the top of the still as vapor, carrying with it substantially all of the divinylacetylene present in the acrylonitrile feed.

In a preferred embodiment of the invention the aqueous solution of divinylacetylene-free acrylonitrile withdrawn from the kettle is conducted to a second still where the acrylonitrile is vaporized from the aqueous solution. The acrylonitrile vapors can be condensed and the acrylonitrile then used as desired. The acrylonitrile thus obtained will contain a very small amount of water, about 3.3 percent by weight. If necessary or desirable the minor amount of water can be removed by known techniques such as azeotropic distillation.

The overhead vapors from the still, consisting of acrylonitrile, divinylacetylene and some water, are not refluxed to the still. In one embodiment of the invention these vapors may be condensed and then washed with water in any desired manner, such as by layering and decanting. The aqueous layer will consist of water, acrylonitrile and a small proportion of divinylacetylene, and may be recycled to the extraction still for use as feed in the process. The other layer, consisting principally of divinylacetylene may be discarded or utilized in any desired manner. Divinylacetylene has a strong tendency to form highly explosive peroxide polymers. It therefore is very desirable to dilute the divinylacetylene layer immediately as it is formed, as for instance by adding to it a hydrocarbon liquid and then disposing promptly of the mixture.

A preferred embodiment of the invention can be described in more detail with reference to the drawing, which is a flow sheet illustrating the preferred embodiment. In the drawing there are depicted an extraction still 11 with a kettle 15 connected to the base of the still 11, a stripping still 16, a condenser 20 and a decanter 23. Acrylonitrile contaminated with divinylacetylene, which is abbreviated as DVA in the drawing, is fed into the extraction still 11 through feed line 12. Water is fed into the still 11 through water feed line 13. During the extraction process an aqueous solution of acrylonitrile, substantially free of divinylacetylene, is removed through line 14 from kettle 15 connected to the base of still 11. This aqueous acrylonitrile is conducted through line 14 into a stripping still 16. In the stripping still 16 the acrylonitrile is vaporized from the aqueous solution and is removed as product from the stripping still 16 through line 17. Water is drained from the stripping still 16 through line 18.

Substantially all of the divinylacetylene introduced into the still 11 is removed with a portion of the acrylonitrile through line 19 as vapors. These vapors are conducted through line 19 into a condenser 20 where they are condensed and diluted with water introduced into the condenser 20 through line 21. The mixture of water, acrylonitrile and divinylacetylene is removed from the condenser 20 in line 22 and conducted in line 22 into a decanter 23. A hydrocarbon is introduced into the decanter 23 through line 24. In the decanter 23 two layers are formed, an aqueous layer containing acrylonitrile contaminated with a small proportion of divinylacetylene and a second layer consisting of divinylacetylene, hydrocarbon and traces of acrylonitrile. The aqueous solution of acrylonitrile layer is removed from the decanter 23 through line 25 and conducted in line 25 to feed line 12 for recycle to the extraction still 11 of the process. The divinylacetylene-hydrocarbon layer is removed from the decanter 23 through line 26 and discarded or disposed of as desired.

In the operation of the process of the invention it is best to employ as feed acrylonitrile from which the water soluble impurities have already been removed, inasmuch as such impurities tend to dissolve divinylacetylene. It has been noted that any chloroprene present in the acrylonitrile feed to the process will be removed along with the divinylacetylene.

The ratio of water to acrylonitrile in the extractive distillation phase of the process will depend in some measure on the extent to which it is desired to remove the divinylacetylene. For the most complete removal of the divinylacetylene, that is, to produce acrylonitrile having one part per million of divinylacetylene or less, the weight ratio of water fed to contaminated acrylonitrile feed should be between 8 and 30 to 1. The particular ratio used will depend in large measure on the number of theoretical plates in the still. Lower proportions of water will result in less complete removal of the divinylacetylene. For example, acrylonitrile containing less than 15 parts per million of acrylonitrile can be produced with a weight ratio of water fed to contaminated acrylonitrile fed between 30 to 1 and 4 to 1.

It is believed that for certain applications acrylonitrile could be employed which had a considerably higher concentration of divinylacetylene than the optimum product produced by the process of the invention. The process could be operated with greater economy, that is with less water fed to the extractive distillation operation and less vapors driven overhead from this operation, if such a product were to be made. If for example the permissible divinylacetylene concentration in the acrylonitrile product were from 100 to 500 parts per million the process could operate with acrylonitrile feed from which the water soluble impurities had not already been removed, these impurities then being removed in the process of the invention. The proportion of water used in the extractive distillation phase of the process could also be reduced below the amount required to dissolve all of the acrylonitrile. I have found that under these conditions even the undissolved acrylonitrile is substantially purged of divinylacetylene, as shown in Examples V and VI.

The process of the invention is operated at atmospheric pressures. Temperatures are not extremely critical, but are determined in large measure by operating conditions, the temperature being maintained at a value sufficient, in the apparatus employed, to drive out of the distillation column all of the divinylacetylene. In the extractive distillation phase of the process the temperature of the boiling aqueous solution of acrylonitrile i. e., in the kettle, is maintained at such a value as to provide boiling at such a rate that the incoming water condenses and dissolves all but about 10 percent or less of the acrylonitrile, and this latter portion is vaporized from the extractive distillation vessel together with the divinylacetylene. Ordinarily this kettle temperature will be between 75° C. and 93° C. The temperature in the extractive distillation vessel, i. e. in the still column, is ordinarily between 65° C. and 73° C.

In the examples below, the apparatus used was as follows. An extraction still was employed which consisted of a one inch by six foot column. Except as noted in Example VII, this column was packed with metal packing which gave it the equivalent of 40 theoretical plates. A feed connection was provided at the middle of the extraction still for introducing acrylonitrile contaminated with divinylacetylene and a second feed connection was provided at the top of the extraction still for introducing water. A kettle was connected to the bottom of the still, with an outlet line connected to the bottom of the kettle. This outlet line from the bottom of the kettle was led to the top of a one inch by three foot stripping still having exit connections at either end. A line from the top of the extraction still led to a condenser.

In each of the examples a continuous run was made and the feed and products for a given period of time were measured and analyzed. In some cases measurements were made for more than one interval of time during the same run, as will be seen.

Example I

This run was made with the apparatus described above, operating at atmospheric pressure and with a temperature in the kettle of 90° C. The temperature in the major portion of the extraction still was 69° C. and at the head of the still, 68° C. During a period of one hour there was fed into the middle of the extraction still column 80 grams of acrylonitrile, contaminated with 1.5 percent by weight of divinylacetylene, and 2,000 grams of water. The distillate from the column comprised 14.7 grams of water and acrylonitrile, with 1.28 grams of divinylacetylene. As product from the stripping still there was obtained 60 grams of acrylonitrile containing less than 0.1 part per million of divinylacetylene.

During a second separate period of 1.5 hours, under the same conditions of pressure and temperature, there was fed into the middle of the extraction still column 120 grams of acrylonitrile contaminated with 1.5 percent by weight of divinylacetylene and 3,000 grams of water. The distillate from the column comprised 31 grams of water and acrylonitrile, with 1.95 grams of divinylacetylene. As product from the stripping still there was obtained 80 grams of acrylonitrile containing less than 0.1 part per million of divinylacetylene.

Example II

This run was made with the apparatus described above, operating at atmospheric pressure and with a temperature in the kettle at 73° C. The temperature in both the major portion of the extraction still and at the head of the still was 67° C. During a period of one hour there was fed into the middle of the extraction still column 240 grams of acrylonitrile, contaminated with 1.5 percent by weight of divinylacetylene, and 2,000 grams of water. The distillate from the column comprised 17.3 grams of water and acrylonitrile with 2.66 grams of divinylacetylene. As product from the stripping still there was obtained 217 grams of acrylonitrile containing less than 0.1 part per million of divinylacetylene.

During a second separate period of 1.5 hours, under the same conditions of pressure and temperature there was fed into the middle of the extraction still column 360 grams of acrylonitrile, contaminated with 1.5 percent by weight of divinylacetylene, and 3,000 grams of water. The distillate from the column comprised 23.3 grams of water and acrylonitrile, with 3.73 grams of divinylacetylene. As product from the stripping still there was obtained 353 grams of acrylonitrile containing less than 0.1 part per million of divinylacetylene.

Example III

This run was made with the apparatus described above, operating at atmospheric pressure and with a temperature in the kettle of 76° C. The temperature in the major portion of the extraction still was 67° C. and at the head of the still, 68° C. During a period of one hour there was fed into the middle of the extraction still column 200 grams of acrylonitrile, contaminated with 1.5 percent by weight of divinylacetylene, and 2,000 grams of water. The distillate from the column comprised 42.5 grams of water and acrylonitrile, with 2.52 grams of divinylacetylene. As product from the stripping still there was obtained less than 0.1 part per million of divinylacetylene.

Example IV

This run was made with the apparatus described above, operating at atmospheric pressure and with a temperature in the kettle of 72° C. The temperature in the major portion of the extraction still was 66° C. and at the head of the still 67° C. During a period of one hour there was fed into the middle of the extraction still column 240 grams of acrylonitrile, contaminated with 1.5 percent by weight of divinylacetylene, and 2,000 grams of water. The distillate from the column comprised 20.5 grams of water and acrylonitrile, with 4.45 grams of divinylacetylene. As product from the stripping still there was obtained 223 grams of acrylonitrile containing less than 0.1 part per million of divinylacetylene.

During a second separate period of one hour, under the same conditions of pressure and temperature, there was fed into the middle of the extraction still column 240 grams of acrylonitrile, contaminated with 1.5 percent by weight of divinylacetylene, and 2,000 grams of water. The distillate from the column comprised 27.4 grams of water and acrylonitrile with 1.72 grams of divinylacetylene. As product from the stripping still there was obtained 193 grams of acrylonitrile containing less than 0.1 part per million of divinylacetylene.

Example V

This run was made with the apparatus described above, operating at atmospheric pressure and with a temperature in the kettle of 72° C. The temperature in the major portion of the extraction still was 66° C., and at the head of the still, 68° C. During a period of one hour there was fed into the middle of the extraction still column 320 grams of acrylonitrile, contaminated with 1.5 percent by weight of divinylacetylene, and 2,000 grams of water. The distillate from the column comprised 36.0 grams of water and acrylonitrile with 3.96 grams of divinylacetylene. As product from the stripping still there was obtained 200 grams of acrylonitrile containing about 3 parts per million of divinylacetylene.

During a second separate period of one hour, under the same conditions of pressure and temperature, there was fed into the middle of the extraction still column 320 grams of acrylonitrile, contaminated with 1.5 percent by weight of divinylacetylene, and 2,000 grams of water. The distillate from the column comprised 38.7 grams of water and acrylonitrile and 4.3 grams of divinylacetylene. As product from the stripping still there was obtained 262 grams of acrylonitrile containing about 1 part per million of divinylacetylene.

It was determined that during the course of this run there remained in the kettle undissolved acrylonitrile in the amount of 19 percent by weight of the feed and this undissolved acrylonitrile contained about 5 parts per million of divinylacetylene.

Example VI

This run was made with the apparatus described above, operating at atmospheric pressure with the temperature in the kettle of 73° C. The temperature in both the major portion of the extraction still and at the head of the still was 67° C. During a period of one hour there was fed into the extraction still column 400 grams of acrylonitrile, contaminated with 1.5 percent by weight of divinylacetylene, and 2,000 grams of water. The distillate from the column comprised 33.1 grams of water and acrylonitrile and 4.86 grams of divinylacetylene. As product from the stripping still there was obtained 211 grams of acrylonitrile containing less than 0.1 part per million of divinylacetylene.

During a second separate period of one hour, under the same conditions of pressure and temperature, there was fed into the middle of the extraction still column 400 grams of acrylonitrile and 2,000 grams of water. The distillate from the column comprised 30.2 grams of water and acrylonitrile, with 3.81 grams of divinyylacetylene. As product from the stripping still there was obtained 249 grams of acrylonitrile containing less than 0.1 part per million of divinylacetylene.

It was determined that during the course of this run there remained in the kettle undissolved acrylonitrile in the amount of 24 percent by weight of feed and this undissolved acrylonitrile contained about 14 parts per million of divinylacetylene.

Example VII

This run was made with the apparatus described above with the exception that instead of metal packing the column was packed with glass helices which gave it the equivalent of 12 theoretical plates. The run was operated at atmospheric pressure and with the temperature in the kettle of 76° C. The temperature in the major portion of the extraction still column was 87° C. and at the head of the still, 65° C. During a period of one hour there was fed into the middle of the extraction still column 128 grams of acrylonitrile, contaminated with 1.5 grams by weight of divinylacetylene, and 1500 grams of water. The distillate from the column comprised 14.3 grams of water and acrylonitrile with 2.68 grams of divinylacetylene. As product from the stripping still there was obtained 80 grams of acrylonitrile containing less than 0.1 part per million of divinylacetylene.

During a second separate period of one hour, under the same conditions of pressure and temperature, there was fed into the middle of the extraction still column 128 grams of acrylonitrile contaminated with 1.5 percent by weight of divinylacetylene, and 1500 grams of water. The distillate from the column comprised 14.9 grams of water and acrylonitrile, with 1.05 grams of divinylacetylene. As product from the stripping still there was obtained 71 grams of acrylonitrile containing less than 0.1 part per million of divinylacetylene.

What is claimed is:

1. Process for recovering acrylonitrile from acrylonitrile contaminated with divinylacetylene which comprises vaporizing said contaminated acrylonitrile under distillation conditions while countercurrently contacting said vapors with water so as to repress distillation of the major portion of the acrylonitrile while permitting distillation of the divinylacetylene, whereby the divinylacetylene is removed in a distillate comprising water, acrylonitrile and divinylacetylene, and the residue remaining comprises an aqueous solution of acrylonitrile substantially free of divinylacetylene, and recovering acrylonitrile from said residue.

2. Process for recovering acrylonitrile from acrylonitrile contaminated with divinylacetylene which comprises vaporizing said contaminated acrylonitrile under distillation conditions while countercurrently contacting said vapors with water so as to repress distillation of the major portion of the acrylonitrile while permitting distillation of the divinylacetylene, whereby the divinylacetylene is removed in a distillate comprising water, acrylonitrile and divinylacetylene, and the residue remaining comprises an aqueous solution of acrylonitrile substantially free of divinylacetylene, and recovering acrylonitrile from said residue, by distilling said acrylonitrile from said aqueous residue.

3. Process for recovering acrylonitrile from acrylonitrile contaminated with divinylacetylene which comprises vaporizing said contaminated acrylonitrile under distillation conditions while countercurrently contacting said vapors with water so as to repress distillation of the major portion of the acrylonitrile while permitting distillation of the divinylacetylene, whereby the divinylacetylene is removed in a distillate comprising water, acrylonitrile and divinylacetylene, condensing said distillate, mixing the condensate with water whereby two layers form, one an aqueous solution of acrylonitrile contaminated with a minor amount of divinylacetylene and the other layer composed predominantly of divinylacetylene, subjecting the acrylonitrile aqueous solution layer to further distillation according to the process, removing the residue from said distillations, said residue comprising acrylonitrile substantially free of divinylacetylene, and recovering acrylonitrile from said residue.

4. Process for recovering acrylonitrile from acrylonitrile contamined with divinylacetylene which comprises vaporizing said contaminated acrylonitrile under distillation conditions while countercurrently contacting said vapors with water so as to repress distillation of the major portion of the acrylonitrile while permitting distillation of the divinylacetylene, whereby the divinylacetylene is removed in a distillate comprising water, acrylonitrile and divinylacetylene, condensing said distillate, mixing the condensate with water whereby two layers form, one an aqueous solution of acrylonitrile contaminated with a minor amount of divinylacetylene and the other layer composed predominantly of divinylacetylene, subjecting the acrylonitrile aqueous solution layer to further distillation according to the process, removing the residue from said distillations, said residue comprising acrylonitrile substantially free of divinylacetylene, and recovering acrylonitrile from said residue, by distilling said acrylonitrile from said aqueous residue.

5. Process for recovering acrylonitrile from acrylonitrile contaminated with divinylacetylene which comprises vaporizing said contaminated acrylonitrile under distillation conditions while countercurrently contacting said vapors with water so as to repress distillation of the major portion of the acrylonitrile while permitting distillation of the divinylacetylene, whereby said divinylacetylene is removed in a distillate with water and a minor portion of said acrylonitrile, and the major portion of said acrylonitrile is recovered from an aqueous residue substantially free of divinylacetylene.

6. Process for recovering acrylonitrile from acrylonitrile contaminated with divinylacetylene which comprises vaporizing said contaminated acrylonitrile under distillation conditions while countercurrently contacting said vapors with water so as to repress distillation of the major portion of the acrylonitrile while permitting distillation of the divinylacetylene, whereby said divinylacetylene is removed in a distillate with water and a minor portion of said acrylonitrile, and the major portion of said acrylonitrile is recovered from an aqueous residue substantially free of divinylacetylene, by distilling said acrylonitrile from said aqueous residue.

References Cited in the file of this patent

UNITED STATES PATENTS

| | | |
|---|---|---|
| 2,782,148 | Geeger | Feb. 19, 1957 |
| 2,782,149 | Suden | Feb. 19, 1957 |